(12) United States Patent
Karbe et al.

(10) Patent No.: US 6,621,986 B2
(45) Date of Patent: Sep. 16, 2003

(54) OPTICAL LENS ARRANGEMENT

(75) Inventors: Peter Karbe, Leun (DE); Holger Wiegand, Frankfurt (DE)

(73) Assignee: Leica Camera AG, Solms (DE)

( * ) Notice: Subject to any disclaimer, the term of this patent is extended or adjusted under 35 U.S.C. 154(b) by 0 days.

(21) Appl. No.: 10/162,106

(22) Filed: Jun. 5, 2002

(65) Prior Publication Data

US 2003/0147639 A1 Aug. 7, 2003

(30) Foreign Application Priority Data

Feb. 2, 2002 (DE) ..................... 202 01 592 U

(51) Int. Cl.[7] ........................... G03B 13/20; G03B 17/48
(52) U.S. Cl. ..................... 396/141; 396/373; 396/544; 359/744
(58) Field of Search ................... 396/141, 379, 396/378, 382, 373, 544, 432; 359/744

(56) References Cited

U.S. PATENT DOCUMENTS

| | | | | |
|---|---|---|---|---|
| 3,981,021 A | * | 9/1976 | Beecher ..................... 396/544 |
| 4,219,264 A | * | 8/1980 | Rodeck ....................... 396/141 |
| 4,406,524 A | * | 9/1983 | Campiche ............... 359/744 X |
| 5,455,711 A | * | 10/1995 | Palmer .................... 359/744 X |
| 6,388,738 B1 | * | 5/2002 | Abe ........................ 396/141 X |

OTHER PUBLICATIONS

Handbook of the Leica System, LEICA, Leica Camera AG, 1996/97, 3 Sheets.

* cited by examiner

*Primary Examiner*—W. B. Perkey
(74) *Attorney, Agent, or Firm*—Foley & Lardner

(57) ABSTRACT

An optical lens arrangement for a rangefinder system in a photographic camera with a fixed viewfinder magnification SK and a fixed measuring base MB is configured to be coupled with a rangefinder eyepiece of the rangefinder system and is designed as an afocal telescope with a minimum 1.1 times and a maximum 1.7 times magnification SL. The magnification SL may be selected so that the product of the viewfinder magnification SK and the magnification SL is at least very nearly equal to 1.

11 Claims, 1 Drawing Sheet

OPTICAL LENS ARRANGEMENT

CROSS REFERENCE TO RELATED APPLICATIONS

This application claims priority of the German patent application 202 01 592.0, filed on Feb. 2, 2002, which is incorporated by reference herein.

FIELD OF THE INVENTION

The innovation relates to an optical lens arrangement for rangefinder systems in photographic cameras with fixed viewfinder magnification SK and fixed measuring base MB.

BACKGROUND OF THE INVENTION

Rangefinder systems in photographic cameras are used to select the field of view that can be photographed with the respective camera lens and, at the same time, to focus the camera lens sharply onto the object lying in the field of view. When used with interchangeable camera lenses having different focal lengths, the rangefinder system contains different masks as bright-line frames, which are assigned to the field of view for the respective focal length and which are reflected into the viewfinder optical path.

For focus adjustment, the rangefinder system contains two observation optical paths, which are separated from one another in the camera housing by a fixed mechanical base length. The viewfinder optical path has a fixed observation direction, while the observation direction of the measuring optical path can be changed by means of an optical element coupled with the focus drive of the camera lens. In the rangefinder eyepiece, the images from both observation directions are superimposed. The focus adjustment is achieved when the images are congruent.

The accuracy of thie focus adjustment depends on the geometrical length of the measuring base and on the magnification of the viewfinder system, with the viewfinder magnification affecting the survey of the bright-line frames for different focal lengths of the camera lens in the field of view. A small viewfinder magnification makes it expedient to represent bright-line frames for short focal lengths to medium focal lengths. A large viewfinder magnification makes it possible to represent bright-line frames for medium to long focal lengths. In this case, however, it is true that the image section represented by the bright-line frames decreases greatly in size from shorter to longer focal lengths. Both the image definition of the image section and the focus adjustment for objects in the respectively smallest bright-line frame are made significantly more difficult because of this.

In practice, photographic cameras have therefore been equipped with rangefinder systems having a different viewfinder magnification. The user can then select the camera with the appropriate viewfinder magnification corresponding to the camera-lens focal lengths that he or she uses most of the time. If he or she wishes to use focal lengths lying outside the suitable range with this camera, then he or she needs to make a compromise between representing the full photographing field of view or the accuracy of the focus adjustment.

As compensation for a compromise in the short focal-length range, special fit-on viewfinders have therefore been developed, which are fitted into the flash shoe of the camera and which ensure exact selection of the full photographing field of view. For focus adjustment, however, it is then necessary to change the eyepiece (Handbook of the Leica System, 1996/97, page 5–18, brilliant view finder for 21 mm and 28 mm lenses).

As compensation for a compromise in the long focal-length range, special viewfinder front attachments have been developed, which are coupled with the longer focal-length camera lens and in front of which both view windows of the rangefinder system are switched (Handbook of the Leica System, 1996/97, page 5–16, view finder front attachment for 135 mm lens). The field of view assigned to a camera lens with 135 mm focal length is magnified by the viewfinder front attachment so much that it fills up the bright-line frame of a camera lens having, e.g., 90 mm focal length. The displayed bright-light frame does not therefore match with the focal length of the camera lens. The complexity of construction for the viewfinder front attachment is considerable.

Viewfinder magnifications used in practice are SK=0.58/0.72/0.85. The geometrical length of the measuring base is, for example, equal to 69.25 mm, so that an effective measuring base of 40.2 mm/49.9 mm/58.9 mm is obtained. When the effective measuring base is greater, the focus adjustment can be visually assessed in a commensurately more accurate way. This is especially important, in particular, for camera lenses with a high aperture and therefore a small depth of focus.

SUMMARY OF THE INVENTION

It is therefore an object of the innovation to provide a way in which the predefined viewfinder magnification can be increased in a simple way when required.

This object is achieved according to the invention by providing for an optical lens arrangement for a rangefinder system in a photographic camera with a fixed viewfinder magnification SK and a fixed measuring base MB, wherein the lens arrangement is configured to be coupled with a rangefinder eyepiece of the rangefinder system and is designed as an afocal telescope with a minimum 1.1 times and a maximum 1.7 times magnification SL.

The fact that the lens arrangement is fitted on the rangefinder eyepiece means that only a single accessory arrangement is needed, which magnifies the images from both superimposed rangefinder optical paths together. This configuration as an afocal telescope does not affect the imaging condition for the two beams coming from the rangefinder system. In particular, observation can furthermore be carried out by an individual wearing spectacles. The specified magnification range makes it possible, with the predetermined viewfinder magnifications used in practice, for the effective measuring base to be magnified to the value of the predetermined geometrical measuring base. This approximately 25% magnification of the effective measuring base leads to a corresponding increase in the adjustment accuracy. The clearly visible larger viewfinder image provides significantly improved perception of feature details inside the respective bright-line frame, especially in the case of telephoto lenses.

It is advantageous for the magnification SL of the lens arrangement to be selected in such a way that the product of the viewfinder magnification SK of the camera and the magnification SL is at least very nearly equal to 1. The size of the viewfinder image then corresponds to the scene observed with the naked eye, so that convenient binocular observation of the feature to be photographed is possible. For example, the viewfinder magnification SK may be approximately 0.85 and the magnification SL may be approximately 1.25, or the viewfinder magnification SK may be approximately 0.72 and the magnification SL may be approximately 1.4, or the viewfinder magnification SK may be approximately 0.58 and the magnification SL may be approximately 1.7.

With a construction of the lens arrangement as a two-lens Galilean telescope, it is possible to ensure reproduction quality at the level of the built-in rangefinder system. A Galilean telescope is distinguished by an erect image and by small overall length. However, the viewing field is limited because of the internally located exit pupil, but this does not represent a disadvantage at the small magnifications required here. Preferably, the focal length $f_1$ of the positive objective component satisfies 15 mm$<f_1<$40 mm and the focal length $f_2$ of the negative ocular component satisfies: −35 mm$<f_2<$−12 mm.

It may also advantageously be possible for the lens arrangement to be coupled on the eyepiece side with a dioptric compensation lens. An external screw thread M12×0.5 on the front side and an equivalent internal screw thread on the eyepiece side may be provided as coupling means.

BRIEF DESCRIPTION OF THE DRAWINGS

An exemplary embodiment of the novel lens arrangement is schematically represented in the drawing, and will be described below.

DETAILED DESCRIPTION OF THE INVENTION

Figure 1:
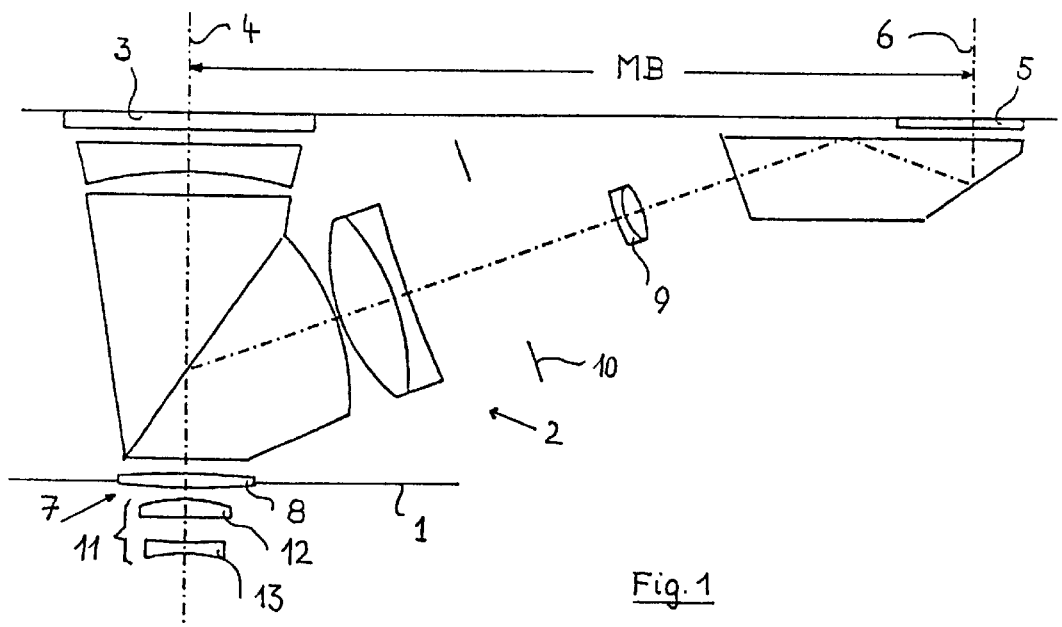
FIG. 1 shows the structure of a rangefinder system with the novel lens arrangement.

FIG. 1 shows a rangefinder system 2 built into the cap 1 of a photographic camera. The rangefinder system 2 has a first viewing window 3 for the viewfinder optical path 4, and a second viewing window 5 for the measuring optical path 6. For example, a lens 8 of the rangefinder ocular part is fitted into the rangefinder eyepiece 7. In the rangefinder eyepiece 7, the two erect images from the viewfinder optical path 4 and the measuring optical path 6 are represented as a double image, and are brought into congruence by the photographer during the range measurement. This customarily involves afocal imaging with reduction of the viewfinder image.

The optical elements of the rangefinder system 2 produce a fixed viewfinder magnification SK. The distance between the viewfinder optical path 4 and the measuring optical path 6 forms the measuring base MB of the rangefinder system 2. The optical element 9 inserted into the measuring optical path 6 is, e.g., variably coupled with a camera lens (not shown) and brings about the change in the observation direction of the measuring optical path 6 when the focus is being adjusted onto the object lying in the field of view. Various bright-line frames may be inserted into the mask plane 10 of the measuring optical path 6. An optical lens arrangement 11 which, in the exemplary embodiment, has a positive objective component 12 and a negative ocular component 13, can be coupled with the rangefinder eyepiece 7.

Figure 2:
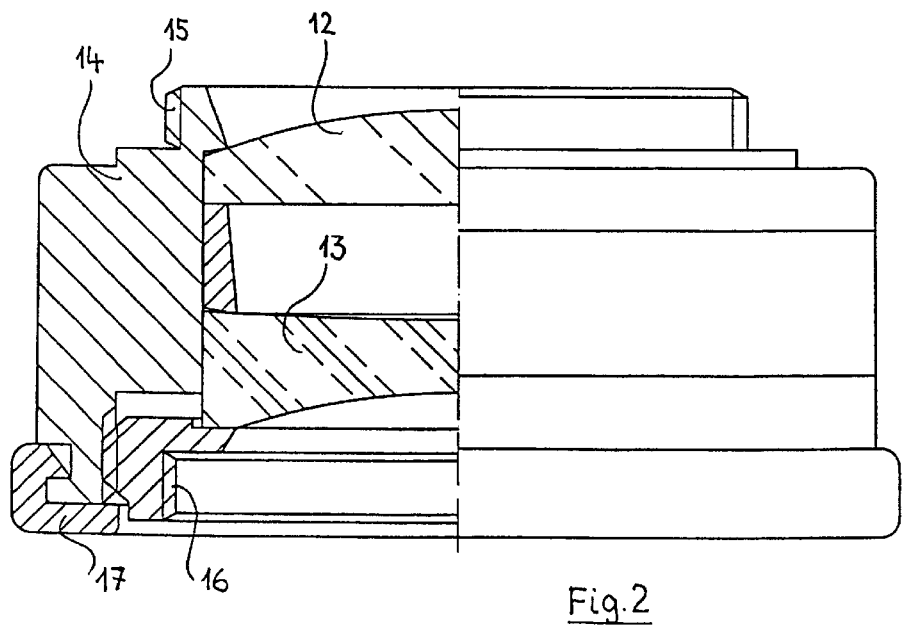
FIG. 2 shows the lens arrangement as a Galilean telescope.

FIG. 2 represents the optical lens arrangement 11 as an interchangeable Galilean telescope with a telescope housing 14. At the front, the telescope housing 14 has an external screw thread 15, which is preferably designed as a fine thread M12×0.5 and can be screwed into a corresponding screw thread on the rangefinder eyepiece 7. At the eyepiece side of the telescope housing 14, the telescope housing 14 has an internal screw thread 16, which is preferably likewise designed as a fine thread M12×0.5. The fact that the diameters of both screw threads 15, 16 are the same ensures that the telescope housing 14 is compatible with other system parts for the rangefinder eyepiece 7, e.g., filters or dioptric compensation lenses, and can be replaced with these. A rubber adaptor 17 as a soft support for an eye-glass is fitted onto the eyepiece side of the telescope housing 14.

PARTS LIST 1. cap
2. rangefinder system
3. first viewing window
4. viewfinder optical path
5. second viewing window
6. measuring optical path
7. rangefinder eyepiece
8. lens
9. optical element
10. mask plane
11. optical lens arrangement
12. positive objective component
13. negative ocular component
14. telescope housing
15. external screw thread
16. internal screw thread
17. rubber adaptor

What is claimed is:

1. An optical lens arrangement for a rangefinder system in a photographic camera with a fixed viewfinder magnification SK and a fixed measuring base MB, wherein the lens arrangement is configured to be coupled with a rangefinder eyepiece of the rangefinder system and is designed as an afocal telescope with a minimum 1.1 times and a maximum 1.7 times magnification SL.

2. The optical lens arrangement as claimed in claim 1, wherein the magnification SL of the lens arrangement is such that the product of the viewfinder magnification SK of the camera and the magnification SL is at least very nearly equal to 1.

3. The optical lens arrangement as claimed in claim 2, wherein the viewfinder magnification SK is approximately 0.85 and the magnification SL is approximately 1.25.

4. The optical lens arrangement as claimed in claim 2, wherein the viewfinder magnification SK is approximately 0.72 and the magnification SL is approximately 1.4.

5. The optical lens arrangement as claimed in claim 2, wherein the viewfinder magnification SK is approximately 0.58 and the magnification SL is approximately 1.7.

6. The optical lens arrangement as claimed in claim 1, wherein the lens arrangement is constructed as a two-lens Galilean telescope.

7. The optical lens arrangement as claimed in claim 6, wherein the focal length $f_1$ of the positive objective component satisfies 15 mm$<f_1<$40 mm and the focal length $f_2$ of the negative ocular component satisfies −35 mm$<f_2<$−12 mm.

8. The optical lens arrangement as claimed in claim 1, wherein an eyepiece side of the lens arrangement is configured to be coupled with a dioptric compensation lens.

9. The optical lens arrangement as claimed in claim 1, wherein an external screw thread on a front side of the lens arrangement is approximately equivalent to an internal screw thread on an eyepiece side of the lens arrangement.

10. The optical lens arrangement as claimed in claim 9, wherein the external screw thread is M12×0.5.

11. The optical lens arrangement as claimed in claim 1, wherein a rubber adaptor, configured as a soft support for an eye-glass, is fitted onto a eyepiece side of the lens arrangement.

* * * * *